April 14, 1942.  A. M. BEARD  2,279,652

POWER TAKE-OFF FOR GROUND PULVERIZERS

Filed Nov. 25, 1940

Inventor
A. M. Beard,
By Christian R. Nielsen
Attorney

Patented Apr. 14, 1942

2,279,652

UNITED STATES PATENT OFFICE 2,279,652

POWER TAKE-OFF FOR GROUND PULVERIZERS

Ava M. Beard, Butler, Mo.

Application November 25, 1940, Serial No. 367,129

1 Claim. (Cl. 97—40)

The invention relates to a power take-off drive for ground pulverizers, particularly of the cylindrical type, and it consists in the constructions, arrangements and combinations herein described and claimed.

It is a particular object of the invention to provide a positive drive means for a pair of ground pulverizing means arranged upon a common shaft, the drive shaft for which may be readily coupled to the power-take-off of tractors now in general use.

It is a further object of the invention to provide means for lowering and elevating the pulverizing means with respect to the ground increasing or decreasing the pulverizing action, as well as to afford transportation of the apparatus from place to place.

It is a still further object of the invention to provide a pulverizer of extreme simplicity in construction, yet sturdy and efficient in operation.

Figure 1:
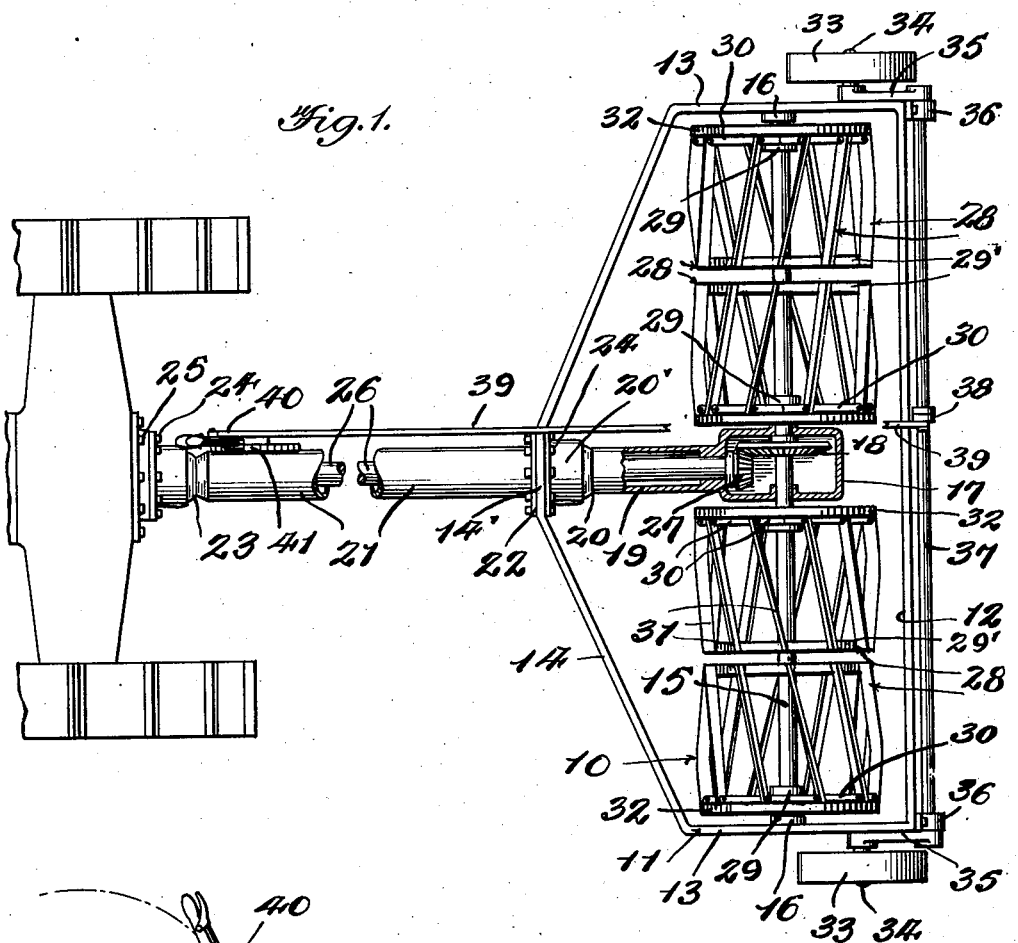

Additional objects, advantages and features of invention will be apparent from the following description considered in conjunction with the accompanying drawing, wherein Figure 1 is a top plan view of my pulverizer, connected to the power-take-off of a tractor, partly in section.

Figure 2:
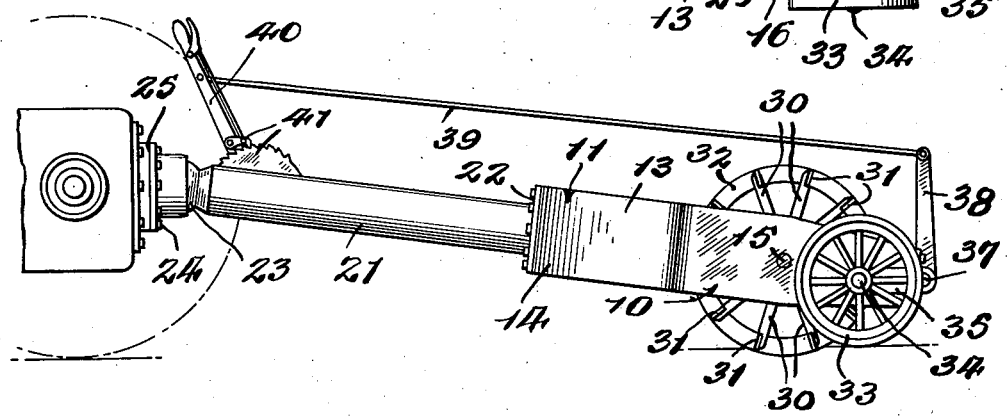

Figure 2 is a side elevation thereof.

There is illustrated a pulverizer generally indicated by the reference character 10, comprising a closed frame 11 consisting of a rear wall 12, parallel spaced end walls 13, and a front wall 14, the latter diverging forwardly at an angle as clearly shown in Figure 1. Intermediate the front wall 14 a horizontal portion 14' is provided for a purpose presently to be explained.

A shaft 15 is revolubly supported in bearings 16 mounted in respective side frames 13, and medially of the shaft there is a housing 17, the shaft being revoluble in suitable bearings of the housing.

Upon the shaft 15, positioned within the housing there is a ring gear 18, suitably keyed thereon for rotation with the shaft, as will be explained hereinafter.

The housing 17 has a forwardly extended tubular extension 19, the free end of which is formed as an element of a universal generally indicated at 20 complemental to a universal coupling 20' bolted to the horizontal portion 14' of the front frame element. A tubular shaft 21 having a flanged end is also bolted to the portion 14', bolts 22 being employed to secure the coupling 20' and shaft 21 in position upon the frame. The other end of the shaft 21 is provided with a universal 23 terminating in a coupling head 24 for attachment to the power-take-off of a tractor indicated formally at 25.

A drive shaft 26 is housed within the shaft 21, the fore end being suitably connected with the power-take-off shaft (not shown), and is of a length to extend rearwardly through the extension 19 and into the housing 17. The shaft 26 has fixed thereon a gear 27 in mesh with the ring gear 18.

Upon opposite sides of the housing 17 and fixed to the shaft 15 there is a pulverizer unit 28. The units 28 are identical in construction and a description of one will suffice for an understanding of the construction.

The unit 28 in the present instance comprises a pair of hubs 29 spaced apart, one adjacent the bearing 16 of the side frame and the other adjacent the housing 17. The hubs 29 are keyed to the shaft 15 for rotation therewith. A plurality of radial arms 30 are carried by the hubs 29 and extended between the arms 30 of one hub to a hub 29' there are mounted cutter blades 31. The blades 31 are preferably arranged diagonally with respect to the longitudinal axis of the shaft 15, so that a draw cut will be imparted upon the earth when the machine is in operation. To reinforce the blades 31 and afford greater rigidity, the ends of the blades may be provided with a rim 32 secured thereto in any suitable manner. Each unit comprises a pair of cutting units although the number may be increased if desired.

In order to afford support as well as traction for the pulverizer unit, a pair of wheels 33 are provided, each wheel being mounted upon a stud shaft 34 of a lever 35. A bearing 36 is mounted upon the rear wall 12 adjacent respective end walls 13 for mounting of a rock shaft 37. The shaft 37 extends beyond the bearings 36 for rigid securement of respective levers 35. Intermediate the length of the shaft 37 there is an upstanding arm 38, rigidly fixed to the shaft and to the free end thereof, there is connected a pull rod 39. The rod 39 is extended forwardly in the direction of the tractor and is connected to a hand lever 40. The hand lever 40 is cooperable with a pawl and ratchet 41 suitably mounted on the shaft 21.

By this arrangement of mounting of the wheels 33 it will be seen that the pulverizer unit 10 may be raised or lowered with respect to the ground or supporting surface and thereby vary the operative relation of the cutting blades.

In use, when the tractor is moved forwardly, a direct drive from the tractor will be imparted to the pulverizer units, effectively breaking down the earth, and obviously the degree of penetration of the cutting blades into the earth may be regulated through setting of the hand lever 40.

While I have specifically shown and described my invention, this is by way of illustration only, and I consider as my own all such modifications in structure as fairly fall within the scope of the appended claim.

I claim:

A ground pulverizing unit comprising a frame having a back wall, parallel end walls and a forwardly diverging front wall having a flat portion medially of the front wall, a shaft revolubly mounted between the end walls, a pair of pulverizing units fixed to the shaft for rotation therewith, a pulverizing unit being mounted upon the sides of the medial portion of the shaft, a housing on the shaft at the medial portion thereof, said housing having a tubular extension and terminating in a universal joint constructed for mounting upon the flat portion of the front wall, a ring gear on the shaft positioned within the housing, a drive shaft extended through the tubular extension and into the housing, a gear on the drive shaft in mesh with the ring gear, said drive shaft having means for connection with the power take-off of a tractor, said frame including a rock shaft on the back wall, link members rigid on the shaft, stub axles on each link, a wheel on each stub axle and means connected with the rock shaft for raising and lowering said link members and wheels.

AVA M. BEARD.